Feb. 12, 1924.                                                    1,483,531
S. THOMAS
MEANS FOR ADJUSTING BRAKE SHOES USED IN TRAMWAY VEHICLES AND THE LIKE
Filed Jan. 6, 1921         6 Sheets-Sheet 1
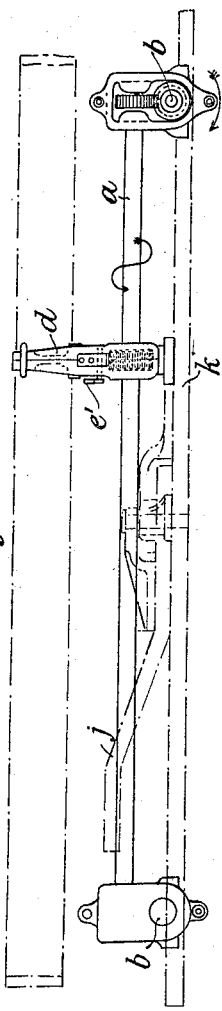
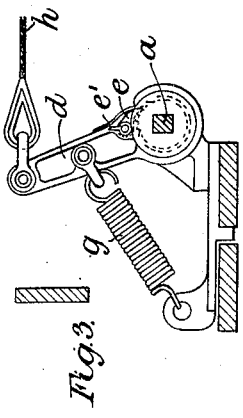
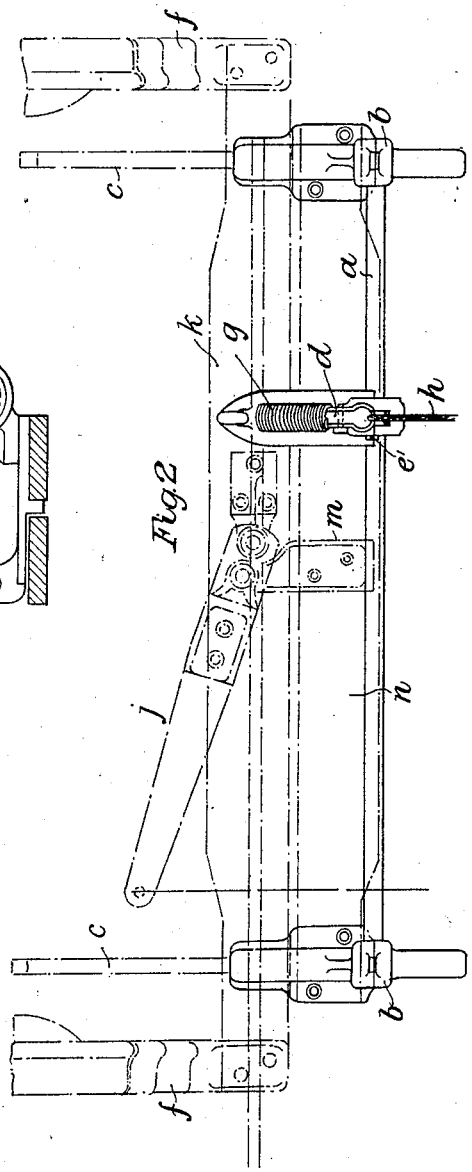
INVENTOR:
Sidney Thomas
By Wm Wallace White
ATTY.

Feb. 12, 1924. 1,483,531
S. THOMAS
MEANS FOR ADJUSTING BRAKE SHOES USED IN TRAMWAY VEHICLES AND THE LIKE
Filed Jan. 6, 1921 6 Sheets-Sheet 3.
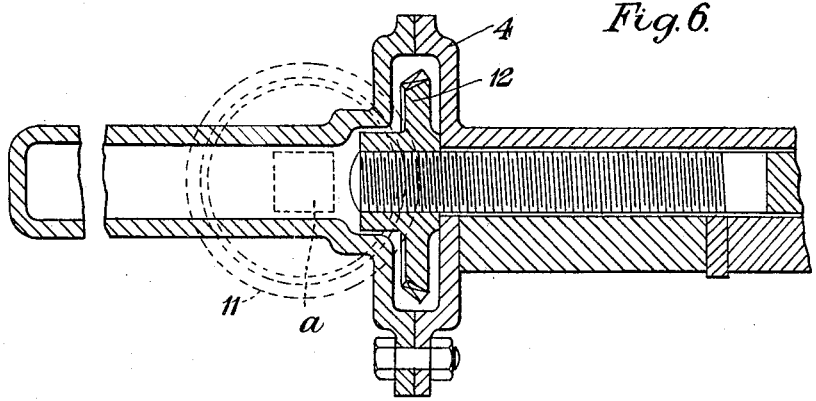
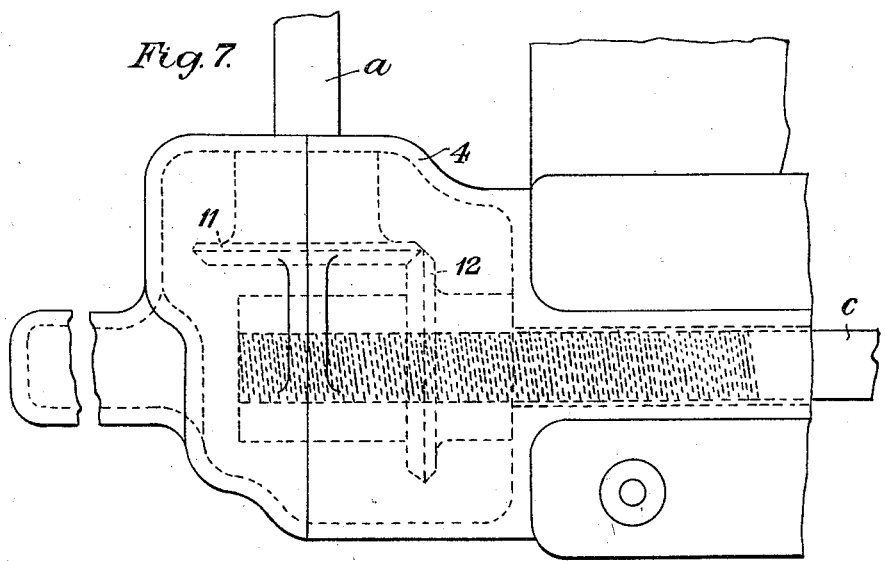
INVENTOR:
Sidney Thomas
By Wm Wallace White
ATT'Y.

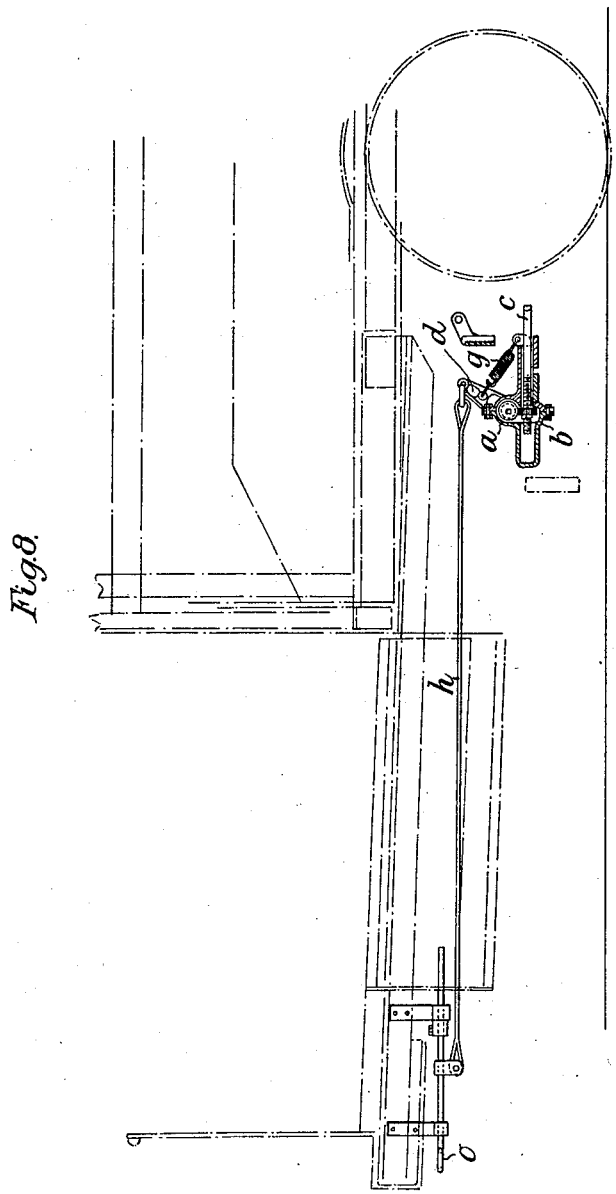

Feb. 12, 1924. 1,483,531
S. THOMAS
MEANS FOR ADJUSTING BRAKE SHOES USED IN TRAMWAY VEHICLES AND THE LIKE
Filed Jan. 6, 1921   6 Sheets-Sheet 5
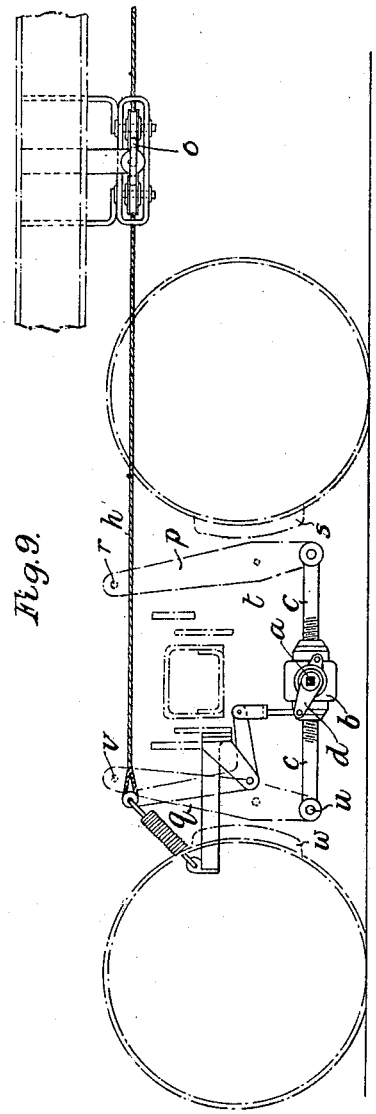
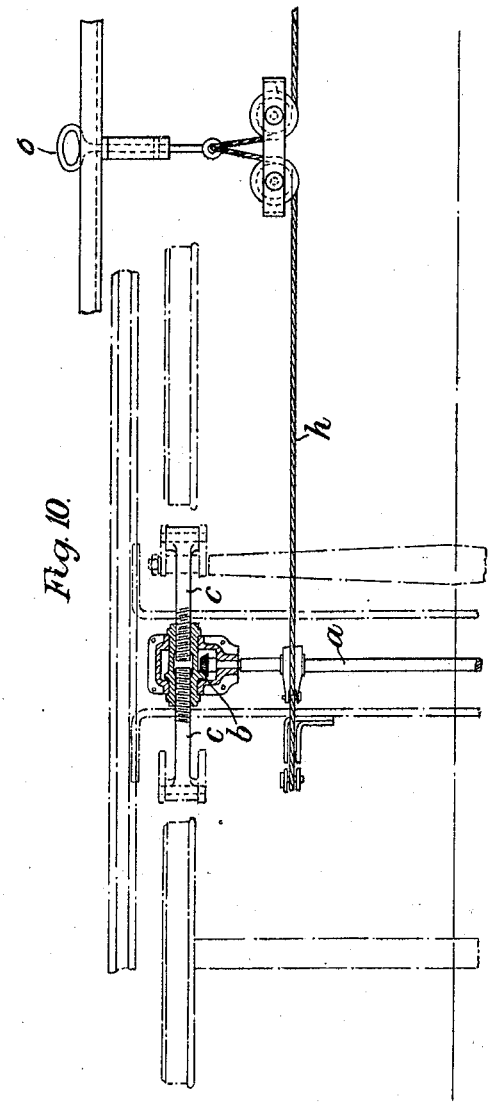
INVENTOR:
Sidney Thomas
By Wm Wallace White
ATTY.

Feb. 12, 1924. 1,483,531
S. THOMAS
MEANS FOR ADJUSTING BRAKE SHOES USED IN TRAMWAY VEHICLES AND THE LIKE
Filed Jan. 6, 1921  6 Sheets-Sheet 6
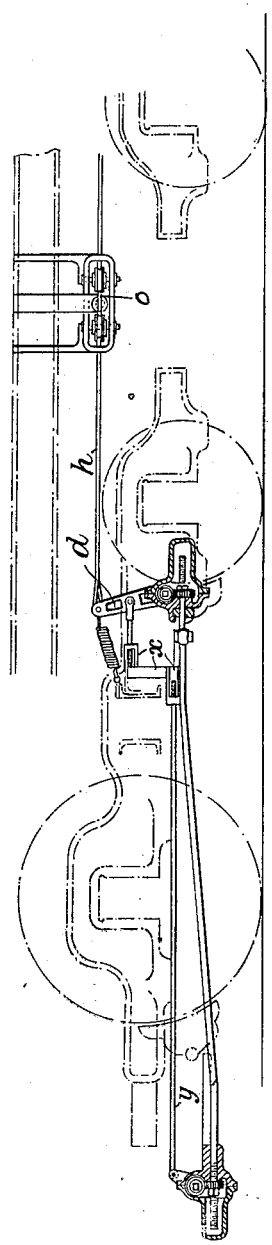
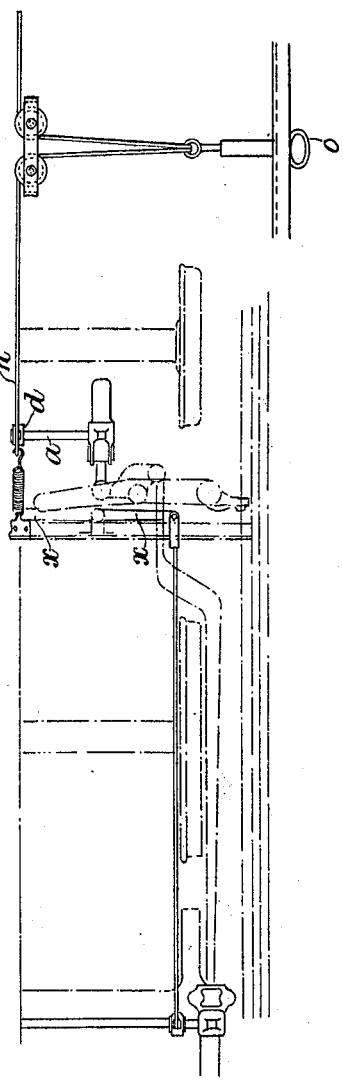
INVENTOR:
Sidney Thomas
By Wm Wallace White
ATTY.

Patented Feb. 12, 1924.

1,483,531

UNITED STATES PATENT OFFICE.

SIDNEY THOMAS, OF LONDON, ENGLAND.

MEANS FOR ADJUSTING BRAKE SHOES USED IN TRAMWAY VEHICLES AND THE LIKE.

Application filed January 6, 1921. Serial No. 435,370.

*To all whom it may concern:*

Be it known that I, SIDNEY THOMAS, of 10 Coleman Street, London, E. C. 2, England, a subject of the King of Great Britain and Ireland, have invented certain new and useful Improvements in or Relating to Means for Adjusting Brake Shoes Used in Tramway Vehicles and the like, of which the following is a specification.

This invention relates to means for adjusting the brake shoes used on tramway vehicles and the like.

The object of this invention is to provide improved manually operated means for adjusting the shoes of brakes.

Apparatus for adjusting brake shoes made in accordance with this invention comprises a shaft extending transversely of the vehicle, connected at each end by gearing to the brake mechanism, a non-return take up device on said shaft adapted to be manually operated independently of the brake operating mechanism from the driver's platform or other convenient places on the car body.

The drawings filed herewith show various methods of carrying out this invention.

Fig. 1 is an elevation of a brake adjusting mechanism made in accordance with this invention, as generally used on four wheel type tramway trucks.

Fig. 2 is a plan of Fig. 1.

Fig. 3 is a detail view in end elevation on an enlarged scale shewing the ratchet device for turning the brake adjuster shaft.

Fig. 6 is a similar view to Fig. 4 showing another alternative mechanism;

Fig. 7 is a plan view of Fig. 6;

Fig. 8 is a part elevation showing the brake adjusting mechanism as applied to a tramcar, or similar vehicle, with a four wheel truck;

Fig. 9 is a part side-elevation showing the brake adjusting mechanism applied to an equal wheel bogie truck.

Fig. 10 is a part plan of Fig. 9;

Fig. 11 is a part side elevation of the brake adjusting mechanism as applied to a maximum traction truck;

Fig. 12 is a plan view of Fig. 11; shewing the operation of the adjusting lever;

A squared shaft $a$ (Figs. 1 and 2) is provided with skew gearing $b$ at each end which operates on the brake rods $c$. The said squared shaft is operated by a ratchet lever $d$ provided with a pawl $e$ adapted to be released when it is desired to reverse the shaft $a$ by means of the lever $e'$ for the purpose of renewing the brake shoes $f$. The ratchet lever is provided with a pull back spring $g$ and the said ratchet lever is connected and adapted to be operated by a flexible wire, rope or cable $h$ leading to some convenient place on the car or truck. A locking device may be provided to prevent the driver of the vehicle tampering with the adjustment of the brakes. The ratchet lever is encased in a dust proof case. In operation with reference to Figs. 1—3 the brake lever $j$ being pivotally mounted on the inner brake beam $k$ carrying brake shoes $f$ at its extremities and being linked by a bracket $m$ to the outer brake beam $n$ which carries at each end the gearing $b$ and adjuster shaft $a$, operates the brakes by forcing the bars $k$ and $n$ apart thus applying the brake shoes $f$ to the wheel and exerting a pull on the brake rods $c$ which are connected to other brake shoes at the other end of the car. When the brake shoes are worn and need adjusting it is only necessary to pull the cable $h$ which operates the ratchet lever, turns the squared adjuster shaft which turns the nuts on the brake rods $c$ by means of the skew gear or the like, thus taking up the wear.

Figure 4:
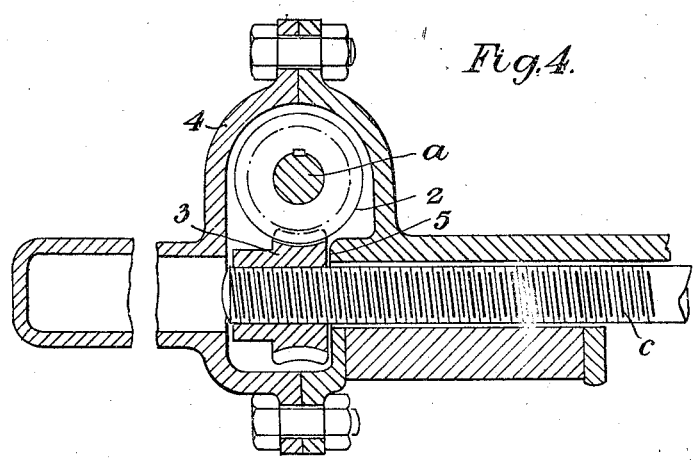
Fig. 4 is a view of the mechanism employed for transmitting the motion of the brake adjuster shaft to the pull rod.
Figure 5:
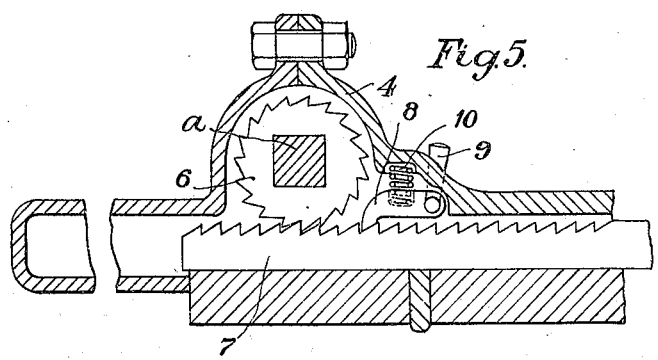
Fig. 5 is a similar view to Fig. 4 showing an alternative mechanism.

The gearing at each end of the shaft $a$ may be of the types as shewn in Figs. 4, 5 and 6.

Referring to Fig. 4 upon the brake adjuster shaft $a$ and at each end thereof is mounted a worm 2 which gears with a corresponding worm wheel 3 screwed internally to form a nut engaging with the brake rod $c$, the end of which is screw threaded for a considerable distance to allow for the brake adjustment.

The wheel 3 can rotate but is prevented from axial movement relative to the casing 4 within which it is housed by the parts 5 so that rotation of the adjuster shaft $a$ causes the wheel 3 to revolve and adjust the effective length of the brake pull rods $c$.

Referring to Fig. 5 the brake adjuster shaft $a$ carries a ratchet wheel 6 which gears with a ratchet rack 7 cut in the end of the pull rod $c$. A pawl 8 carried by the casing 4 and provided with an arm 9 by which it can be released and with a spring 10 to keep it in engagement if required, is provided to prevent return motion of the pull rod $c$.

Referring to Fig. 6 upon the shaft $a$ is mounted a bevel wheel 11 which gears with a bevel wheel 12 mounted on the screwed end of the pull rod $c$, and operating to alter the effective length of the pull rods as described with reference to Fig. 4.

Referring to Fig. 8 which shows the invention as applied to a tramcar the cable $h$ is led to the front of the car and connected to a handle $o$ whereby a straight pull is obtained. The cable $h$ operates the ratchet lever as described above. The ratchet lever operates the shaft $a$ and gearing $b$ which, through the nuts on the brake rods $c$ takes up the slack of the brake shoes.

Referring to Figs. 9 and 10 the handle $o$ operates two cables, one for each bogie. The ratchet lever $d$ operates the shaft $a$ as before described but in this case the gearing $b$ is so adapted as to adjust the length of the rods $c$ $c$ which are horizontally opposed to one another and are connected to the brake levers $p$ and $q$. In operation the braking force is applied to the lever $p$ at the point $r$ and as soon as the shoe $s$ touches the wheel the point $t$ becomes the pivot and a push is exerted through the rods $c$ $c$ to the lever $q$ at the point $u$ and as the lever $q$ is always on a fixed pivot $v$ the brake shoe $w$ is applied to the wheel.

Referring to Figs. 11 and 12 which show the invention as applied to a maximum traction truck the cable $h$ operates the ratchet lever $d$ which operates the shaft $a$ as before described but the lever $d$ is also connected by a double lever $x$ and rod $y$ to the ratchet lever operating the mechanism for the adjustment of the big wheel brake shoes. With a brake adjusting mechanism made in accordance with this invention all brake shoes are adjusted evenly and simultaneously according to wear and with this construction it is impossible to adjust one pair of brake shoes without adjusting the other. It is also impossible to adjust the brake shoes so that they bind tight against the wheel and when it is necessary to fit new brake shoes the brake rods are all slackened off evenly. Much time is thereby saved in the car sheds as the brakes can be adjusted in a moment and it is also possible for the inspector at the terminus to adjust the brakes without having to send the car into the depot when the driver reports the brakes to be defective.

What I claim and desire to secure by Letters Patent is:—

1. Apparatus for adjusting the brakes of tramcars, comprising brake rods disposed on each side of the center line of the vehicle, a shaft extending transversely of the vehicle, gearing at each end of said shaft connecting said shaft to said brake rods, a non-return take-up device disposed on said shaft between the said brake rods and adapted to rotate said shaft for the purpose of adjusting the effective length of said brake rods, said non-return take-up device being adapted to be manually operated independently of the brake-operating means from the driver's platform, and also adapted to adjust said brake rods to any desired effective length whereby no derangement of the adjustment of the brake shoes is effected by the loading and unloading of the car.

2. Apparatus for adjusting the brakes of tramcars, comprising brake rods disposed on each side of the center line of the vehicle, a shaft extending transversely of the vehicle, gearing at each end of said shaft connecting said shaft to said brake rods, a non-return take-up device disposed on said shaft between the said brake rods and adapted to rotate said shaft for the purpose of adjusting the effective length of said brake rods, said non-return take-up device being adapted to be manually operated independently of the brake operating means from the driver's platform, whereby no derangement of the adjustment of the brake shoes is effected by the loading and unloading of the car, and means for simultaneously operating a plurality of said non-return take-up devices from one point by one handle, said means comprising a cable attached to each said non-return take-up device and to said handle.

3. An apparatus for adjusting the brakes of tram-cars comprising brake rods disposed on each side of the center line of the vehicle, a shaft extending transversely of the vehicle, gearing at each end of said shaft connecting said shaft to said brake rods, a non-return take-up device disposed on said shaft, said device comprising a ratchet mounted on said shaft, a ratchet arm carrying a spring pressed pawl cooperating therewith, manual means for operating said ratchet arm in one direction and means for returning said ratchet arm to its normal position when said manual means is released.

In testimony whereof I have signed my name to this specification.

SIDNEY THOMAS.